United States Patent
Derry et al.

(10) Patent No.: US 8,933,148 B2
(45) Date of Patent: Jan. 13, 2015

(54) SOLVENTLESS RADIATION CURABLE STRETCHABLE INK COMPOSITION

(71) Applicant: Xerox Corporation, Norwalk, CT (US)

(72) Inventors: Cameron Derry, London (CA); Yiliang Wu, Oakville (CA); Naveen Chopra, Oakville (CA); Peter G. Odell, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/957,185

(22) Filed: Aug. 1, 2013

(65) Prior Publication Data

US 2014/0220321 A1    Aug. 7, 2014

Related U.S. Application Data

(60) Provisional application No. 61/849,815, filed on Feb. 6, 2013.

(51) Int. Cl.
| | | |
|---|---|---|
| *C09D 11/101* | (2014.01) | |
| *C09D 11/30* | (2014.01) | |
| *C09D 11/107* | (2014.01) | |

(52) U.S. Cl.
CPC .............. *C09D 11/30* (2013.01); *C09D 11/107* (2013.01); *C09D 11/101* (2013.01)
USPC ..... 523/160; 523/161; 428/211.1; 428/195.1; 522/18

(58) Field of Classification Search
CPC .................................................... C09D 11/101
USPC ........................................................ 523/160
See application file for complete search history.

(56) References Cited

U.S. PATENT DOCUMENTS

| | | | |
|---|---|---|---|
| 3,258,477 A | | 6/1966 | Plueddemann et al. |
| 5,128,391 A | * | 7/1992 | Shustack .......................... 522/92 |
| 6,063,827 A | | 5/2000 | Sacripante et al. |
| 6,593,049 B1 | | 7/2003 | Veregin et al. |
| 6,756,176 B2 | | 6/2004 | Stegamat et al. |
| 6,830,860 B2 | | 12/2004 | Sacripante et al. |
| 7,834,097 B2 | | 11/2010 | Albano et al. |
| 7,855,254 B2 | | 12/2010 | Abusleme et al. |
| 2006/0222831 A1 | | 10/2006 | Sloan |
| 2006/0222991 A1 | | 10/2006 | Sacripante et al. |
| 2010/0091052 A1 | | 4/2010 | Ogawa et al. |
| 2013/0017373 A1 | | 1/2013 | Wu et al. |

OTHER PUBLICATIONS

Yiliang Wu, et al., U.S. Appl. No. 13/957,213, filed Aug. 1, 2013, "Stretchable Ink Composition," not yet published.
Yiliang Wu, et al., U.S. Appl. No. 13/957,374, filed Aug. 1, 2013, "Stretchable Ink Composition," not yet published.
Yiliang Wu, et al., U.S. Appl. No. 13/495,915, filed Jun. 13, 2012, "Stretchable Ink Composition," not yet published.

* cited by examiner

*Primary Examiner* — Doris Lee
(74) *Attorney, Agent, or Firm* — Marylou J. Lavoie

(57) ABSTRACT

A solventless radiation curable stretchable ink composition including an aliphatic urethane monomer or oligomer; an acrylic ester monomer; a photoinitiator; and an optional colorant. A patterned article including a deformable substrate; an image printed on the deformable substrate, the image being formed from a radiation curable stretchable ink composition comprising an aliphatic urethane monomer or oligomer; an acrylic ester monomer; a photoinitiator; and an optional colorant.

11 Claims, No Drawings

SOLVENTLESS RADIATION CURABLE STRETCHABLE INK COMPOSITION

RELATED APPLICATIONS

This application claims the benefit of U.S. Provisional Application Ser. No. 61/849,815, filed Feb. 6, 2013, which is hereby incorporated by reference herein in its entirety.

Commonly assigned U.S. patent application Ser. No. 13/957,213, entitled "Stretchable Ink Composition", filed concurrently herewith, with the named inventors Yiliang Wu, Cameron Derry, and Ke Zhou, is hereby incorporated by reference herein in its entirety.

Commonly assigned U.S. patent application Ser. No. 13/957,374, entitled "Stretchable Ink Composition", with the named inventors Yiliang Wu and Cameron Derry, filed concurrently herewith, is hereby incorporated by reference herein in its entirety.

BACKGROUND

Disclosed herein is a solventless radiation curable stretchable ink composition including an aliphatic urethane monomer or oligomer; an acrylic ester monomer; a photoinitiator; and an optional colorant. Further disclosed is a patterned article including a deformable substrate; an image printed on the deformable substrate, the image being formed from a radiation curable stretchable ink composition comprising an aliphatic urethane monomer or oligomer; an acrylic ester monomer; a photoinitiator; and an optional colorant.

Printing marks or images on deformable substrates is desirable for many applications, such as flexible medical devices, including surgical tools and implantable medical devices, robot skins, textiles (e.g., for stretchable swimming suits), rubber products such as tires, tubes, and cables, and the like. Consumable products based on rubbers and some textiles are also stretchable. Because of the highly deformable characteristic of the substrate, a stretchable ink is desired for printing on such substrates to achieve excellent image quality, image robustness, and image longevity.

Previous work by the inventors includes a stretchable ink composition which comprises water, a colorant, a surfactant, and a fluoroelastomer, as disclosed in U.S. patent application Ser. No. 13/182,579 to Wu et al., filed on Jul. 14, 2011, which is hereby incorporated by reference herein in its entirety.

U.S. patent application Ser. No. 13/495,915, which is hereby incorporated by reference herein in its entirety, of Wu et al., describes in the Abstract thereof an ink composition suitable for ink jet printing, including printing on deformable substrates. In embodiments, the stretchable ink composition is based on an aqueous ink formulation comprising an emulsion of a polyurethane elastomer in combination with colorant dispersions, and surfactants.

While known compositions and processes are suitable for their intended purposes, a need remains for improved ink compositions with certain characteristics. Specifically, a need remains for ink compositions suitable for printing on deformable or stretchable substrates. Additionally, a need remains for stretchable inks that form robust images which can be stretched and relaxed for a high number of cycles. There is also a need for stretchable inks that have good color stability. There is also a need for stretchable inks that exhibit good resistance to environmental factors such as light, chemicals, water, and oxidizing gases, thus generating hydrophobic and water-resistant images. There further remains a need for stretchable inks that are suitable for both indoor and outdoor applications. There further remains a need for such inks can be applied digitally.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a solventless radiation curable stretchable ink composition including an aliphatic urethane monomer or oligomer; an acrylic ester monomer; a photoinitiator; and an optional colorant.

Also described is a patterned article including a deformable substrate; an image printed on the deformable substrate, the image being formed from a solventless radiation curable stretchable ink composition comprising an aliphatic urethane monomer or oligomer; an acrylic ester monomer; a photoinitiator; and an optional colorant.

DETAILED DESCRIPTION

A solventless radiation curable stretchable ink composition is provided including an aliphatic urethane monomer or oligomer; an acrylic ester monomer; a photoinitiator; and an optional colorant.

The stretchable monomer-based ink compositions herein provide good elongation after curing, low viscosity for ink jet printing, low or no tackiness on the surface, and wide substrate latitude including excellent adhesion on silicon and latex rubber substrates. In embodiments, the ink compositions herein comprise a combination of oligomer and monomer components, in embodiments, 1) a mixture of aliphatic urethane oligomer and acrylic ester in combination with an acryloxyalkylsilane or 2) a mixture of aliphatic urethane oligomer and acrylic ester in combination with an acrylic oligomer having methacrylate acid ester, acrylic ester and aromatic urethane acrylate, and combinations thereof.

As used herein, "solventless" radiation curable stretchable ink means that "the absence of an organic solvent;" that is, organic solvents are not used to dissolve the monomer or oligomer components of the ink or are not used as the ink vehicle. However, it is understood that minor amounts of such solvents may be present in the resins as a consequence of their use in the process of forming the resin.

The solventless radiation curable stretchable ink composition can be ink jet printed onto various deformable substrates, such as for example, a stretchable latex rubber substrate, to provide an image having image longevity. The printed images exhibit superior performance on the deformable substrates, which are generally difficult to print upon.

In embodiments, the solventless radiation curable stretchable ink composition can be used to prepare a patterned article. In embodiments, a patterned article is provided comprising a deformable substrate; an image printed on the deformable substrate, the image being formed from a solventless radiation curable stretchable ink composition comprising an aliphatic urethane monomer or oligomer; an acrylic ester monomer; and an optional colorant.

In embodiments, the solventless radiation curable stretchable ink composition herein has a low viscosity which is compatible with inkjet printing methods. The printed solventless radiation curable stretchable ink provided herein can form robust images on a variety of substrate including normal paper, coated photo paper, and rubber substrate. Moreover, in embodiments, images printed with the solventless radiation curable stretchable ink herein can be stretched hundreds of cycles without showing any crack and de-lamination, when printed on a deformable substrate, in embodiments, a rubber substrate.

Monomers and Oligomers.

Aliphatic Urethane Monomer or Oligomer and Acrylic Ester Monomer.

The radiation curable stretchable ink composition comprises one or more aliphatic urethane monomers or oligomers.

The solventless stretchable ink composition herein is based on a monomer approach. The inks herein meet several challenges and requirements for monomer based stretchable ink jettable ink, including 1) good elongation after curing, 2) low viscosity for inkjet printing, 3) low or no tackiness on the surface, and 4) wide substrate latitude. A selected combination of hard and soft segments is provided which achieves good elongation. Therefore, the selected monomers or oligomers used herein provided, in combination, a crosslinking density that provides good elongation. Oligomers can have a high viscosity which is not suitable for inkjet printing. The present solventless ink composition provides a combination that reduces viscosity to a jettable range while still employing oligomers. The final cured ink has a glass transition temperature (Tg) that is less than room temperature for elongation. Usually, a low Tg component is very tacky at room temperature. The present solventless ink composition reduces or eliminates tackiness. Unlike printing on paper which has high surface energy, rubber substrates such as silicon rubber generally have a low surface energy. The present solventless ink compositions provided good adhesion to many different substrates, including rubber substrates. The solventless ink compositions herein comprise a combination of oligomer and monomer components. In embodiments, the solventless ink compositions comprises a mixture of aliphatic urethane oligomer and acrylic ester in combination with acryloxyalkylsilane or acrylic oligomer comprising a member of the group consisting of methacrylate acid ester, acrylic ester, aromatic urethane acrylate, and combinations thereof. The inks provide good elongation, non-tacky surface, and excellent adhesion on silicon and latex rubber substrates.

In embodiments, the aliphatic urethane monomer or oligomer can comprise an aliphatic urethane/tackifier oligomer available as Sartomer CN3001.

In embodiments, the aliphatic urethane monomer or oligomer may be present in the ink in any desired or effective amount. In specific embodiments, the aliphatic urethane monomer or oligomer is present in an amount of from about 15 to about 50 weight percent, or from about 20 to about 45 weight percent, or from about 25 to about 40 weight percent, based on the total weight of the solventless radiation curable stretchable ink composition.

In embodiments, the acrylic ester monomer can comprise an acrylic ester available as Sartomer CD420.

In embodiments, the acrylic ester monomer may be present in the ink in any desired or effective amount. In specific embodiments, the acrylic ester monomer is present in an amount of from about 30 to about 70 percent, or from about 30 to about 60 percent, or from about 35 to about 60 percent, by weight, based on the total weight of the solventless radiation curable stretchable ink composition.

Acryloxyalkylsilane.

In certain embodiments, the radiation curable stretchable ink composition comprises a mixture of aliphatic urethane oligomer and acrylic ester in combination with an acryloxyalkylsilane.

Acryloxyalkylsilane can have the general formula

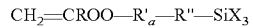

wherein R is a methyl radical or a hydrogen atom, R' is a divalent group composed of carbon, hydrogen, and oxygen, wherein the oxygen is in a configuration selected from the group consisting of ether linkages and hydroxyl groups, and wherein in R' the ratio of carbon atoms to oxygen atoms is not greater than 3 to 1, and R' is attached to both the COO and the R" groups through CO linkages, a has a value of 0 or 1, R" is an alkylene radical of from 1 to 4 carbon atoms, and X is a monovalent hydrolysable group. Acryloxyalkylsilanes have been described in U.S. Pat. No. 3,258,477, which is hereby incorporated by reference herein in its entirety. In embodiments, the acryloxyalkylsilane can comprise an acryloxyalkylsilane available as Sartomer CN3105.

In embodiments, the acryloxyalkylsilane may be present in the ink in any desired or effective amount. In specific embodiments, the acryloxyalkylsilane is present in an amount of from about 5 to about 20 weight percent, or from about 8 to about 15 weight percent, based on the total weight of the solventless radiation curable stretchable ink composition.

Acrylic Oligomer.

In certain other embodiments, the radiation curable stretchable ink composition comprises a mixture of aliphatic urethane oligomer and acrylic ester in combination with an acrylic oligomer. In embodiments, the acrylic oligomer comprises a member of the group consisting of methacrylate acid ester, acrylic ester, aromatic urethane acrylate, and combinations thereof. In embodiments, the acrylic oligomer is an acrylic oligomer with methacrylate acid ester, acrylic ester, and aromatic urethane acrylate available as Sartomer CN3105.

In embodiments, the acrylic oligomer may be present in the ink in any desired or effective amount. In specific embodiments, the acrylic oligomer is present in an amount of from about 5 to about 30 weight percent, or from about 10 to about 25 percent, or from about 10 to about 20 percent, by weight, based on the total weight of the solventless radiation curable stretchable ink composition.

In embodiments, the aliphatic urethane monomer or oligomer present in an amount of from about 15 to about 50 weight percent based on the total weight of the ink composition; the acrylic ester monomer present in an amount of from about 30 weight percent to about 70 weight percent based on the total weight of the ink composition; an acrylic oligomer present in an amount of from about 5 weight percent to about 30 weight percent based on the total weight of the ink composition; and an acryloxyalkylsilane present in an amount of from about 5 weight percent to about 20 weight percent based on the total weight of the ink composition.

Photoinitiator.

The solventless radiation curable stretchable ink composition may optionally include an initiator, such as, for example, a photoinitiator. Such an initiator is desirable for assisting in curing of the ink. In embodiments, a photoinitiator that absorbs radiation, for example ultra-violet (UV) light radiation, to initiate curing of the curable components of the ink may be used. Therefore, in embodiments, the radiation curable stretchable ink composition is an ultra-violet radiation curable ink composition. As the photoinitiator for ink compositions that are cured by free-radical polymerization, for instance, ink compositions containing acrylate groups or inks comprised of polyamides, mention may be made of photoinitiators such as benzophenones, benzoin ethers, benzil ketals, α-hydroxyalkylphenones, α-alkoxyalkylphenones α-aminoalkylphenones and acylphosphine photoinitiators sold under the trade designations of IRGACURE® and DAROCUR® from Ciba. Specific examples of suitable photoinitiators include 2,4,6-trimethylbenzoyldiphenylphosphine oxide (available as BASF LUCIRIN® TPO); 2,4,6-trimethylbenzoylethoxyphenylphosphine oxide (available as BASF LUCIRIN® TPO-L); bis(2,4,6-trimethylbenzoyl)-phenyl-phosphine oxide (available as Ciba IRGACURE® 819) and other acyl phosphines; 2-methyl-1-(4-methylthio) phenyl-2-(4-morpholinyl)-1-propanone (available as Ciba IRGACURE® 907) and 1-(4-(2-hydroxyethoxy)phenyl)-2-hydroxy-2-methylpropan-1-one (available as Ciba IRGACURE® 2959); 2-benzyl 2-dimethylamino 1-(4-morpholinophenyl)butanone-1 (available as Ciba IRGACURE® 369); 2-hydroxy-1-(4-(4-(2-hydroxy-2-methylpropionyl)-benzyl)-phenyl)-2-methylpropan-1-one (available as Ciba IRGACURE® 127); 2-dimethylamino-2-(4-methylbenzyl)-1-(4-morpholin-4-ylphenyl)-butanone (available as Ciba IRGACURE® 379); titanocenes; isopropylthioxanthone; 1-hydroxy-cyclohexylphenylketone; benzophenone; 2,4,6-trimethylbenzophenone; 4-methylbenzophenone; diphenyl-(2,4,6-trimethylbenzoyl) phosphine oxide; 2,4,6-trimethyl-benzoylphenylphosphinic acid ethyl ester; oligo(2-hydroxy-2-methyl-1-(4-(1-methylvinyl)phenyl)propanone); 2-hydroxy-2-methyl-1-phenyl-1-propanone; benzyl-dimethylketal; and mixtures thereof. Mention may also be made of amine synergists, which are described as co-initiators that donate a hydrogen atom to a photoinitiator and thereby form a radical species that initiates polymerization (amine synergists can also consume oxygen dissolved in the ink—as oxygen inhibits free-radical polymerization its consumption increases the speed of polymerization), for example such as ethyl-4-dimethylaminobenzoate and 2-ethylhexyl-4-dimethylaminobenzoate. This list is not exhaustive, and any known photoinitiator that initiates the free-radical reaction upon exposure to a desired wavelength of radiation such as UV light can be used without limitation.

The photoinitiator may absorb radiation of about 200 to about 420 nanometers wavelengths in order to initiate cure, although use of initiators that absorb at longer wavelengths, such as the titanocenes that may absorb up to 560 nanometers, can also be used without restriction.

The photoinitiator can be present in any suitable or desired amount. In embodiments, the total amount of initiator included in the solventless radiation curable stretchable ink composition may be from, for example, about 0.5 to about 15 percent by weight, or from about 1 to about 10 percent by weight, based on the total weight of the ink composition.

Colorant.

The stretchable ink composition herein may also contain a colorant. Any suitable or desired colorant can be used in embodiments herein, including pigments, dyes, and mixtures and combinations thereof.

As noted, any suitable or desired colorant can be selected in embodiments herein. The colorant can be a dye, a pigment, or a mixture or combination thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue ($CoO—Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The colorant can be present in the stretchable ink composition in any desired or effective amount, in embodiments, the colorant can be present in an amount of from about 0.05 to about 15 percent, or from about 0.1 to about 10 percent, or from about 1 to about 5 percent by weight, based on the total weight of the stretchable ink composition.

Additives.

The stretchable ink composition can further comprise suitable known additives as optional additives.

In embodiments, the stretchable ink composition is a low-viscosity composition. The term "low-viscosity" is used in contrast to conventional high-viscosity inks such as screen printing inks, which tend to have a viscosity of at least 1,000 centipoise (cps). In specific embodiments, the ink disclosed herein has a viscosity of no more than about 100 cps, no more than about 50 cps, or no more than about 20 cps, although the viscosity can be outside of these ranges. When used in ink jet printing applications, the ink compositions are generally of a viscosity suitable for use in said ink jet printing processes.

In embodiments, the stretchable ink compositions have a surface tension of at least about 22 dynes per centimeter, at least about 25 dynes per centimeter, at least about 28 dynes per centimeter, no more than about 40 dynes per centimeter, in another embodiment no more than about 38 dynes per centimeter, and or no more than about 35 dynes per centimeter, although the surface tension can be outside of these ranges.

In embodiments, the stretchable ink compositions contain particulates having an average particle diameter of no larger than about 5 micrometers ($\mu$m), no larger than about 2 $\mu$m, no larger than about 1 $\mu$m, or no larger than about 0.5 $\mu$m, although the particulate size can be outside of these ranges. In specific embodiments, the polyurethane elastomer is in an emulsion form in the ink, having an average particle diameter of no larger than about 2 $\mu$m, no larger than about 1 $\mu$m, or no larger than about 0.5 $\mu$m, although the particulate size can be outside of these ranges.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

Also disclosed herein is a process which comprises applying an ink composition as disclosed herein to a substrate in an imagewise pattern.

The ink compositions can be used in a process which entails incorporating the ink composition into an ink jet printing apparatus and causing droplets of the ink to be ejected in an imagewise pattern onto a substrate. In a specific embodiment, the printing apparatus employs a thermal ink jet process wherein the ink in the nozzles is selectively heated in an imagewise pattern, thereby causing droplets of the ink to be ejected in imagewise pattern. In another embodiment, the printing apparatus employs an acoustic ink jet process wherein droplets of the ink are caused to be ejected in imagewise pattern by acoustic beams. In yet another embodiment, the printing apparatus employs a piezoelectric ink jet process, wherein droplets of the ink are caused to be ejected in imagewise pattern by oscillations of piezoelectric vibrating elements. Any suitable substrate can be employed.

In a specific embodiment, the process entails printing the ink onto a deformable substrate, such as textile, rubber, rubber sheeting, plastic, plastic sheeting, coated paper, or the like. In some embodiments, the substrate is a stretchable substrate, such as textile or rubber sheets. In other embodiments, the substrate is a plastic which is deformable at an elevated temperature higher than the glass transition temperature of the plastic, for example, in the process of molding into 3-dimensional objects. When the ink disclosed herein is used, the imagewise pattern will not be damaged upon molding. The rubber sheets with the imagewise pattern can be used, for example, as wrap for a 3-D object.

In one embodiment, the inks disclosed herein can be printed on a rubber substrate, such as natural polyisoprene, polybutadiene rubber, chloroprene rubber, neoprene rubber, butyl rubber (copolymer of isobutylene and isoprene), styrene-butadiene rubber, silicon rubber, nitrile rubber (which is a copolymer of butadiene and acrylonitrile), ethylene propylene rubber, ethylene propylene diene rubber, epichlorohydrin rubber, polyacrylic rubber, ethylene-vinyl acetate, polyether block amides, polysulfide rubber, chlorosulfonated polyethylene as Hypalon®, or the like. In a specific embodiment, the inks disclosed herein can be printed on a deformable substrate, in embodiments, silicon rubber, polyacrylic rubber, butyl rubber, or neoprene rubber substrate and the imaged substrate can be stretched in one axial direction (i.e., along the x-axis, as opposed to both the x-axis and the y-axis) to, in embodiments, at least 110%, at least 150%, at least 200%, or at least 500% of the length of its original dimension, in embodiments, at least about 50 times, at least about 100 times, or at least about 500 times, without exhibiting visible cracks or delamination. In embodiments, the stretchable ink has the characteristic that an image printed with the stretchable ink composition can be stretched in one axial direction to up to at least 110% along the length of its original dimension without exhibiting any visible cracks or delamination to the naked human eye; or has the characteristic that an image printed with the stretchable ink composition can be stretched in one axial direction to from about 110% to about 500% along the length of its original dimension without exhibiting any visible cracks or delamination to the naked human eye.

In embodiments, images generated with the stretchable inks herein are highly water-resistant. In one embodiment, images generated with the inks exhibit a water droplet contact angle of at least about 80°, at least about 90°, or at least about 95°, although the contact angle can be outside of these ranges. The water-resistant characteristic renders the ink disclosed herein suitable for outdoor applications or printing on water-related products such vehicle wrap, swimming suits, and the like.

In a specific embodiment, the images generated with the stretchable inks disclosed herein have a good chemical resistance. For example, they can exhibit good to excellent resistance toward alcohols, acetic acid, acetamide, allyl bromide, allyl chloride, benzoyl chloride, ethers, esters, hydrocarbons, blood, salt solutions, and the like.

In embodiments, images generated with the stretchable inks disclosed herein have a tensile strength of at least about 1.0 MPa, at least about 3 MPa, at least about 4 MPa, at least about 8 MPa, no more than about 25 MPa, no more than about 20 MPa, or no more than about 18 MPa, as measured by ASTM D412C, in embodiments a tensile strength of at least 1.0 MPa and no more than 25 MPa, although the tensile strength can be outside of these ranges.

In embodiments, images generated with the stretchable inks disclosed herein have an elongation at break of at least about 150%, at least about 200%, at least about 400%, no more than about 1000%, no more than about 800%, or no more than about 700%, as measured by ASTM 0412C, although the elongation at break can be outside of these ranges. Generally, the images have a larger elongation at break than that of the deformable substrate.

In embodiments, images generated with the stretchable inks disclosed herein have a hardness (Shore A) value of at least about 20, at least about 30, at least about 40, no more than about 100, no more than about 90, or no more than about 85, as measured by ASTM 2240, although the hardness can be outside of these ranges.

In embodiments, images generated with the stretchable inks disclosed herein form a continuous layer on the substrate. Therefore, the images will have a small color difference with or without stretching. This is in contrast to some conventional stretchable images that are composed of a dots array. Images based on a discontinuous dots array have poor image quality, especially upon stretching, for example, the color density will decrease dramatically. In embodiments, the images generated with the stretchable ink composition herein has a color difference (ΔE) less than 5.0, or less than 3.5, or less than 3.0, or less than 2.0, or less than 1.0, when stretched in one axial direction to about 150%. It is generally known that untrained naked human eyes cannot differentiate the colors with color difference (ΔE) values of <3.0. Color difference (ΔE) values of >6.0 are considered a very obvious color difference.

In embodiments, images generated with the stretchable inks disclosed herein have an excellent adhesion on various substrates prior to or after stretching.

In embodiments, a patterned article herein comprises a deformable substrate; an image printed on the deformable substrate, the image being formed from a solventless radiation curable stretchable ink comprising an aliphatic urethane monomer or oligomer, an acrylic ester monomer, and an optional colorant. In a specific embodiment, the printed image can be stretched along one axis to at least 110% of the length of its original dimension without exhibiting visible cracks or delamination from the deformable substrate. In another embodiment, the image printed with the stretchable ink composition has a color difference less than 3.0 when stretched in one axial direction to about 150% relative to a non-stretched printed image.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Commercially available oligomer CN3001 from Sartomer (Exton, Pa.), a class of aliphatic urethane oligomer, was initially identified as an elastomeric material after self-curing tests. It was stretchable up to the maximum elongation of the tested latex rubber substrate. To get within the desired viscosity range for jetting, various acrylate monomers were added to the oligomers. The monomers chosen had the criteria of low viscosities and low glass transition temperature to retain the elasticity of the oligomer. CD420 (also commercially available from Sartomer), a class of small molecule acrylic ester monomer, was used to lower the viscosity.

A problem with films prepared from both CN3001 and CD420 was the large degree of tackiness. While the entire coating was solid after the cure, and it appeared no residual monomer remained by the absence of material transferred after contact, the film was very tacky. It was discovered that the tackiness was a material property of the two component mixture of CN3001 and CD420 after investigating both the curing exposure time and initiator concentrations. To lower the tackiness, a third component was identified and introduced to increase the density of the hard segments and to improve the surface properties without limiting the elasticity. Oligomer CN3105 (also commercially available from Sartomer) which is a class of acrylic oligomer with methacrylate acid ester, acrylic ester and aromatic urethane acrylate, or monomer acryloxypropyltrimethoxysilane was identified and used to increase density of hard segments and to lower surface tackiness.

Therefore, in embodiments, a specific combination of components provided which provided a desired combination of properties including elasticity, surface tack, ink viscosity and printing quality, a final optimized formulation was discovered. In further embodiments, a specific combination of components provided in a specific ratio was discovered which provided a desired combination of properties including elasticity, surface tack, ink viscosity and printing quality. Exemplary inks having the formulations as shown in Table 1 were prepared and printed using a Dimatix™ piezoelectric printer.

TABLE 1

Solventless Radiation Curable Stretchable Ink

| Example 1 | | Example 2 | |
|---|---|---|---|
| Component | Weight % | Component | Weight % |
| Irgacure ® UV10 | 0.2% | Irgacure ® UV10 | 0.2% |
| Irgacure ® IC819 | 1.0% | Irgacure ® IC819 | 1.0% |
| Irgacure ® IC127 | 3.5% | Irgacure ® IC127 | 3.5% |
| CN3001 | 33.0% | CN3001 | 33.0% |
| CN3105 | 14.0% | Acryloxypropyltrimethoxysilane | 9.5% |

TABLE 1-continued

Solventless Radiation Curable Stretchable Ink

| Example 1 | | Example 2 | |
|---|---|---|---|
| Component | Weight % | Component | Weight % |
| CD420 | 47.3% | CD420 | 51.8% |
| Pigment Blue 15 (copper phthalocyanine) | 1.0% | Pigment | 1.0% |
| Viscosity Range (mPa-s) | 12.1-11.9 | Viscosity Range (mPa-s) | 10.6-8.2 |
| Avg Viscosity @ 50° C. (mPa-s) | 12 | Avg Viscosity @ 50° C. (mPa-s) | 9.4 |

Inks of both formulations had the best printing performance at 20 μm drop spacing. The Example 1 ink had the best printing performance at 55° C., and the Example 2 ink was best printed at 40° C. Inks of both formulations had exemplary lifetime once loaded in the print head, with all nozzles working and remaining unclogged.

Images were printed onto plasma cleaned latex and silicone substrates according to the optimized parameters. The two substrates were purchased from commercial sources and cleaned before printing. They were rinsed with isopropyl alcohol (IPA) solvent before being plasma cleaned for 1 minute in air plasma. The inks were printed in a 4 centimeter by 4 centimeter square, with two printing passes before curing. Both inks had very good adhesion on the silicone and latex substrates. The cured image was intact and unaffected by multiple stretching cycles and vigorous rubbing of the image. Tape test was conducted to verify the adhesion using scotch tape. All films passed the tape adhesion test, even on the silicone substrate after multiple stretching cycles. This was a great achievement as silicone rubber is notoriously difficult for a printed film to adhere to. Images corresponding to the printed cured films of Example 1 and Example 2 on silicone and latex, as well as their tape test after stretching are shown below.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A solventless radiation curable stretchable ink composition comprising:
   an aliphatic urethane monomer or oligomer;
   an acrylic ester monomer;
   a photoinitiator; and
   an optional colorant;
   wherein the stretchable ink after curing has a tensile strength of at least 1.0 MPa and no more than 25 MPa.

2. The radiation curable stretchable ink composition of claim 1, wherein the aliphatic urethane monomer or oligomer is present in an amount of from about 15 to about 50 weight percent based on the total weight of the ink composition.

3. The radiation curable stretchable ink composition of claim 1, wherein the colorant is selected from the group consisting of dyes, pigments, and combinations thereof.

4. The radiation curable stretchable ink composition of claim 1, wherein the radiation curable stretchable ink composition is an ultra-violet radiation curable ink composition.

5. The radiation curable stretchable ink composition of claim 1, wherein the acrylic ester monomer is present in an amount of from about 30 weight percent to about 70 weight percent based on the total weight of the ink composition.

6. The radiation curable stretchable ink composition of claim 1, having the characteristic that an image printed with the stretchable ink composition can be stretched in one axial direction to up to at least 110% along the length of its original dimension without exhibiting any visible cracks or delamination to the naked human eye.

7. The radiation curable stretchable ink composition of claim 1, further comprising:
   an acryloxyalkylsilane.

8. The radiation curable stretchable ink composition of claim 7, wherein the acryloxyalkylsilane is present in an amount of from about 5 weight percent to about 20 weight percent based on the total weight of the ink composition.

9. The radiation curable stretchable ink composition of claim 1, further comprising:
   an acrylic oligomer comprising a member of the group consisting of methacrylate acid ester, acrylic ester, aromatic urethane acrylate, and combinations thereof.

10. The radiation curable stretchable ink composition of claim 9, wherein the acrylic oligomer is present in an amount of from about 5 weight percent to about 30 weight percent based on the total weight of the ink composition.

11. A solventless radiation curable stretchable ink composition comprising:
    an aliphatic urethane monomer or oligomer;
    an acrylic ester monomer;
    a photoinitiator; and
    an optional colorant;
    having the characteristic that an image printed with the stretchable ink composition can be stretched in one axial direction to up to at least 110% along the length of its original dimension without exhibiting any visible cracks or delamination to the naked human eye.

* * * * *